United States Patent
Eslami Dehkordi et al.

(10) Patent No.: US 10,068,048 B1
(45) Date of Patent: Sep. 4, 2018

(54) GENERATING CLOCK TREES FOR A CIRCUIT DESIGN

(71) Applicant: Xilinx, Inc., San Jose, CA (US)

(72) Inventors: Mehrdad Eslami Dehkordi, Los Gatos, CA (US); Marvin Tom, Cupertino, CA (US); Sridhar Krishnamurthy, San Jose, CA (US); Frank Mueller, Erie, CO (US)

(73) Assignee: XILINX, INC., San Jose, CA (US)

( * ) Notice: Subject to any disclaimer, the term of this patent is extended or adjusted under 35 U.S.C. 154(b) by 130 days.

(21) Appl. No.: 15/213,214

(22) Filed: Jul. 18, 2016

(51) Int. Cl.
G06F 17/50 (2006.01)

(52) U.S. Cl.
CPC ...... G06F 17/5081 (2013.01); G06F 17/5077 (2013.01); *G06F 2217/62* (2013.01); *G06F 2217/84* (2013.01)

(58) Field of Classification Search
CPC .... G06F 1/10; G06F 2217/62; G06F 17/5054; G06F 17/5031; G06F 2217/84; G06F 17/5077; G06F 1/06; G06F 1/08; G06F 2213/0038
USPC .................. 716/108, 113, 114, 134
See application file for complete search history.

(56) References Cited

U.S. PATENT DOCUMENTS

| | | | |
|---|---|---|---|
| 6,429,715 B1 | 8/2002 | Bapat et al. | |
| 6,440,780 B1* | 8/2002 | Kimura | G06F 17/505 438/129 |
| 6,590,826 B1 | 7/2003 | Sawyer | |
| 6,952,813 B1 | 10/2005 | Rahut | |
| 6,998,876 B1 | 2/2006 | Conn | |
| 7,071,756 B1 | 7/2006 | Vadi et al. | |
| 7,111,268 B1 | 9/2006 | Anderson et al. | |
| 7,430,728 B1 | 9/2008 | Rahut | |
| 7,904,860 B1 | 3/2011 | Rahut | |
| 7,978,802 B1 | 7/2011 | Raha et al. | |
| 8,001,504 B1 | 8/2011 | Campbell | |
| 8,205,180 B1 | 6/2012 | Anderson et al. | |
| 2007/0033560 A1* | 2/2007 | Johnston | G06F 17/505 716/114 |
| 2012/0119805 A1* | 5/2012 | John | G06F 17/5031 327/161 |

* cited by examiner

*Primary Examiner* — Nghia Doan
(74) *Attorney, Agent, or Firm* — LeRoy D. Maunu

(57) ABSTRACT

The disclosure describes approaches for generating a clock tree for a circuit design. Initial clock trees are generated and elements are assigned to locations on an integrated circuit (IC). Each of the initial clock trees includes a clock root, a spine including the clock root, and branches connected to and extending from the spine. Each clock load is coupled to one of the branches. The clock tree further includes programmable delay circuits having initial delay values that are balanced. If the circuit design does not satisfy timing constraints, at least one clock root is moved from a respective first location to a respective second location.

18 Claims, 18 Drawing Sheets

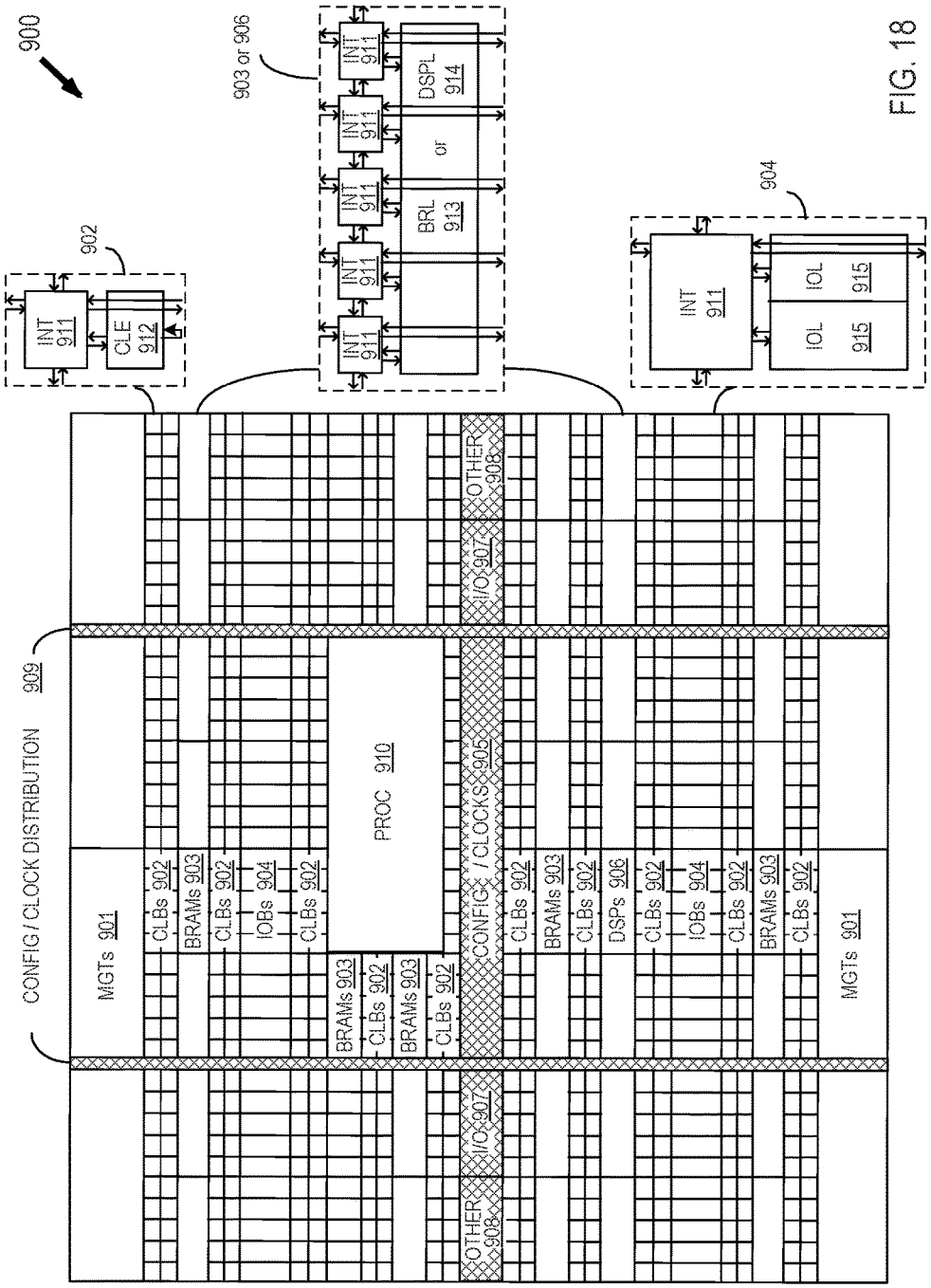

US 10,068,048 B1

GENERATING CLOCK TREES FOR A CIRCUIT DESIGN

TECHNICAL FIELD

The disclosure generally relates to generating clock trees for a circuit design.

BACKGROUND

Clock skew occurs when a clock signal from the same source arrives at different components at different times. If the clock skew is too large, timing constraints such as setup and/or hold times of the circuit design may be violated.

In an effort to avoid timing violations, some circuit design tools create balanced clock trees. A clock tree generally distributes the same clock signal from a clock source to synchronous circuit elements ("clock loads") of the circuit design, and in some integrated circuits (ICs), clock routing resources are configurable to establish multiple clock trees that route clocks signals from multiple clock sources. A clock tree includes a portion of a vertical track, which may be referred to as a "spine," and a portion(s) of a horizontal track(s) that intersects the spine. The portion of the horizontal track may be referred to as a "branch." Each of the branches includes a programmable delay circuit that can be programmed with a delay value for introducing a specified amount of delay in the clock signal.

Some circuit design tools initially create a balanced clock tree in an initial placement and configuration of clock resources for a circuit design. A balanced clock tree has clock routing resources configured in a manner that attempts to minimize clock skew on the clock tree. In many instances a balanced clock tree alleviates clock skew for parts of a circuit design. However, in some instances, clock skew timing violations occur in spite of the balanced clock tree.

SUMMARY

In one implementation, a method of generating a clock tree for a circuit design is performed on a programmed processor. The processor generates initial clock trees having elements assigned to locations on an integrated circuit (IC). Each of the initial clock trees includes, respectively, a clock root, a spine, a plurality of branches, and a plurality of programmable delay circuits. The clock root is centered among a plurality of clock loads, and the spine includes the clock root. The branches are connected to and extend from the spine. Each clock load is coupled to one of the branches. The plurality of programmable delay circuits are coupled to the plurality of branches, respectively, and programmed by initial delay values. For each one branch that is nearer the clock root than another branch of the plurality of branches, the initial delay value of the programmable delay circuit coupled to the one branch is greater than the initial delay value of the programmable delay circuit coupled to the other branch. The processor determines whether or not the circuit design satisfies timing constraints. If the circuit design does not satisfy the timing constraints, the processor moves at least one respective clock root of a clock tree of the initial clock trees from a respective first location to a respective second location.

In another implementation, a system for generating a clock tree for a circuit design includes a computer processor and a memory arrangement coupled to the computer processor. The memory arrangement is configured with instructions that when executed by the computer processor cause the computer processor to generate initial clock trees having elements assigned to locations on an integrated circuit (IC). Each of the initial clock trees includes, respectively, a clock root, a spine, a plurality of branches, and a plurality of programmable delay circuits. The clock root is centered among a plurality of clock loads, and the spine includes the clock root. The branches are connected to and extend from the spine. Each clock load is coupled to one of the branches. The plurality of programmable delay circuits are coupled to the plurality of branches, respectively, and programmed by initial delay values. For each one branch that is nearer the clock root than another branch of the plurality of branches, the initial delay value of the programmable delay circuit coupled to the one branch is greater than the initial delay value of the programmable delay circuit coupled to the other branch. Execution of the instructions causes the processor to determine whether or not the circuit design satisfies timing constraints. If the circuit design does not satisfy the timing constraints, the processor moves at least one respective clock root of a clock tree of the initial clock trees from a respective first location to a respective second location.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 18 shows a programmable integrated circuit (IC) 900 on which the disclosed circuits and processes may be implemented.

DETAILED DESCRIPTION

Figure 1:
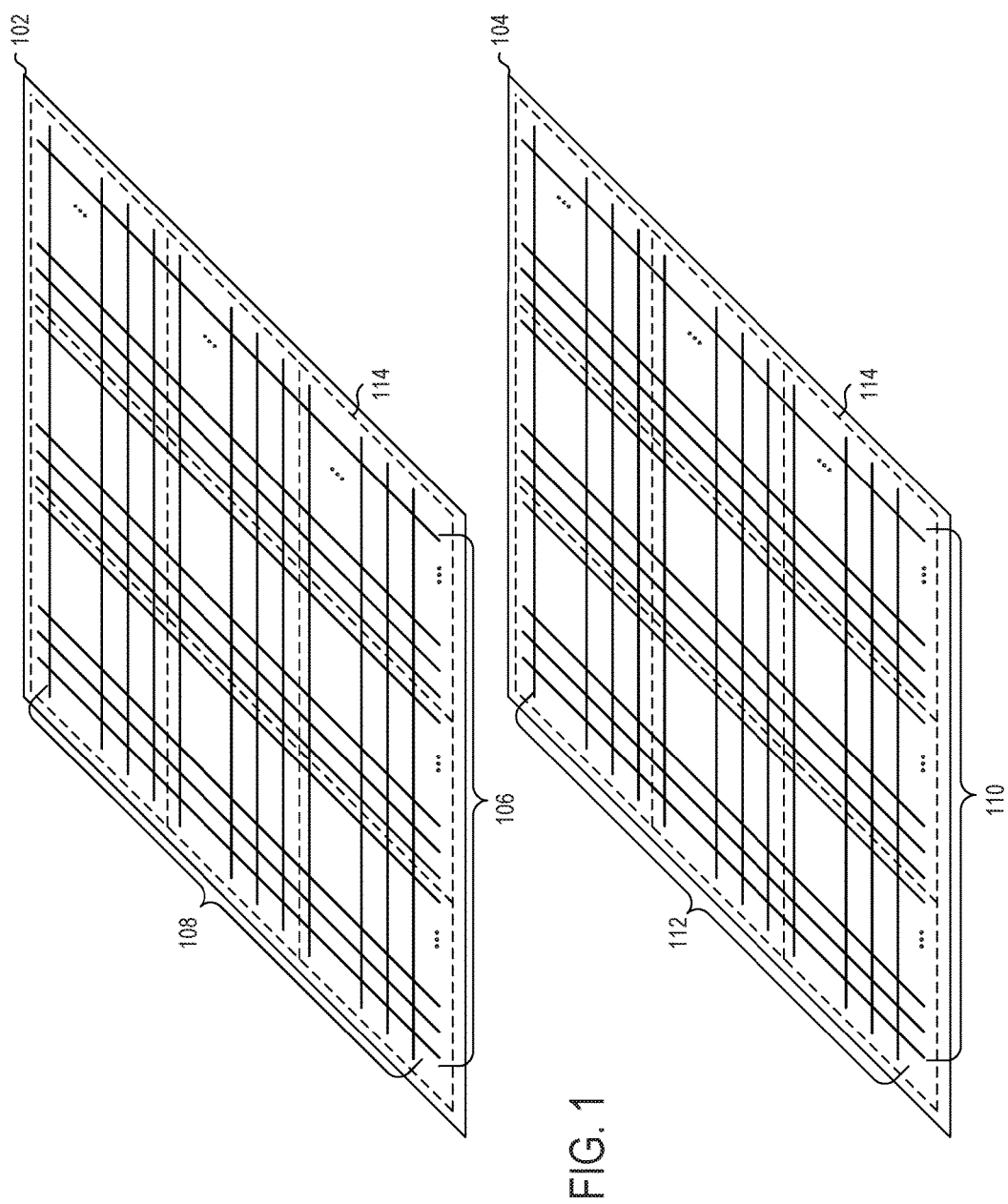
FIG. 1 shows examples a routing layer 102 and a distribution layer 104 of a clock distribution network of a programmable IC.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems attempt to eliminate timing violations resulting from clock skew in balanced clock trees of a circuit design. Balanced clock trees are evaluated and modified according to a number of approaches. One approach includes converting a clock tree having a single clock root to a clock tree having multiple clock roots. Another approach includes converting the centered clock root(s) of a balanced clock to a clock tree in which the clock root(s) are not centered. Yet another approach involves changing programmable delay values associated with branches of a balanced clock tree. Lastly, cross domain clock skew between multiple balanced clock trees may be resolved by moving the clock roots of the balanced clock trees nearer to one another.

Some programmable ICs, such as ULTRASCALE™ devices from XILINX®, Inc., have a programmable clock distribution network. The clock distribution network includes two independent meshes of routing and distribution grids. FIG. 1 shows examples of a routing layer 102 and a distribution layer 104 of a clock distribution network of a programmable IC. The layers may be part of a programmable IC having programmable logic, input/output (I/O), signal routing, and processor resources (see FIG. 18), for example. The routing layer and distribution layer include respective sets of clock distribution tracks. Each set of distribution tracks includes horizontal tracks and vertical tracks. For example, the routing layer includes vertical tracks 106 and horizontal tracks 108, and the distribution layer includes vertical tracks 110 and horizontal tracks 112. Those skilled in the art will recognize that an actual device would be much larger and have many more clock distribution tracks.

The clock distribution network may be configured to route a clock signal from a clock source to any clock region in the device via horizontal and vertical tracks of the routing layer. The example clock distribution network includes 9 regions, which are outlined with dashed lines in the routing and distribution layers. Region 114 is an example of one of the regions in the routing and distribution layers.

The programmable interconnection point at which a track of the routing layer is connected to a vertical track of the distribution layer may be referred to as the clock root. The region in which the track of the routing layer is connected to the vertical track of the distribution layer may be referred to as the root region. A clock tree can be expanded from the clock root and root region by connecting selected horizontal distribution-layer tracks to the vertical track that has the clock root, and extending the horizontal distribution tracks to all regions where loads of the clock tree are placed. The portion of the distribution-layer vertical track to which the routing-layer track connects may be referred to as a "spine" of the clock tree, and the portions of the horizontal distribution tracks connected to the spine may be referred to as branches.

Current tools create a balanced clock tree in attempts to reduce clock skew. In a balanced clock tree, each single clock root is located near the center of the bounding box of the clock loads coupled to that clock root. Programmable delays on the branches are set values that attempt to equalize the delays of clock tree from the clock root to the loads in the different clock regions. For example, for each branch of the clock tree that is nearer the clock root than another branch of the clock tree, the initial delay value of the closer branch is greater than the initial delay value of the branch that is farther from the clock root. In some instances, clock skew in a balanced clock tree will cause timing violations. The disclosed methods and systems determine whether or not a circuit design satisfies timing constraints. For critical paths involved in timing constraint violations, the methods and systems restructure a balanced clock tree(s) by moving at least one clock root of the clock tree from an initial location in the balanced clock tree to different location. With the new clock root location, the clock tree may no longer be balanced but timing constraints may be satisfied.

Figure 2:
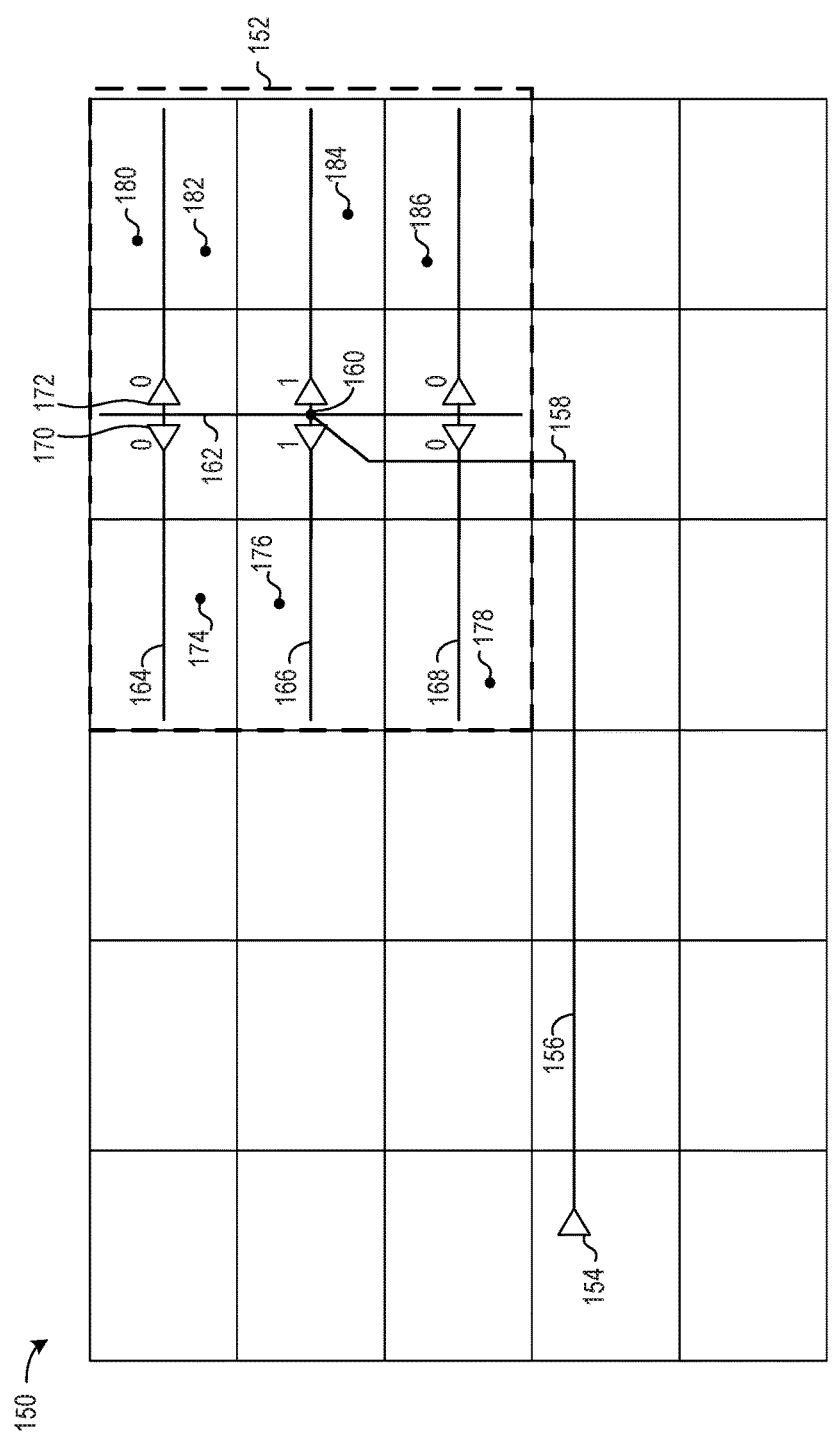
FIG. 2 illustrates an example of a balanced clock tree on a programmable IC 150 having 30 clock regions, which are shown as rectangular blocks.

FIG. 2 illustrates an example of a balanced clock tree on a programmable IC 150 having 30 clock regions, which are shown as rectangular blocks. The area bounded by dashed-line block 152 contains clock regions having loads to which the clock signal from clock source 154 needs to connect. The clock tree begins at clock source 154, and horizontal routing track 156 carries the clock signal to vertical routing track 158. A clock source is a circuit that generates or provides a clock signal, such as a phase-locked loop (PLL), a high-speed serializer-deserializer (SERDES), or an input/output pin. Vertical routing track 158 is connected to a vertical distribution track at programmable interconnection point 160, which establishes the position of the clock root. The interconnection point at which the vertical routing track is connected to a vertical distribution track may also be referred to as the "clock root." A portion of the vertical distribution track is established as the spine 162. The terminal ends of the spine are defined according to the regions in which the clock loads are placed. The routing and distribution tracks are configurable to terminate segments of the tracks so that different clock signals may be carried on different segments of the same track.

The spine 162 is connected to horizontal distribution tracks at programmable interconnection points. Portions of the horizontal distribution tracks are branches of the clock tree, and the terminal ends of the branches are defined according to the regions in which the clock loads 174, 176, 178, 180, 182, 184, 186 are placed. The example has branches 164, 166, and 168. Each branch includes a pair of buffer circuits that have programmable delay values. The buffer circuits may be referred to herein as "programmable delay-and-buffer circuits". One of the programmable delay-and-buffer circuits delays and buffers the clock signal to the left side of the branch and the other delays and buffers the clock signal to the right side of the branch. For example, branch 164 includes programmable delay-and-buffer circuits 170 and 172.

In many instances, clock skew can be ameliorated by setting the programmable delay values on different branches to different values. The greater delays seen at branches farthest from the clock root can be compensated for by setting a delay value at the root row and setting decreasing delay values for branches farther from the root. In the clock tree exemplified in FIG. 2, as there is one branch above the clock root and one branch below the clock root, the delay value at the branch 166 connected to the root may compensate for one branch crossing. For example, the delay values of 1 shown next to the delay-and-buffer circuits indicates a delay equivalent to the delay introduced by spine 162 crossing one branch. The branches 164 and 168 farthest from the clock root have delay values of 0 as there are no additional branch crossings for which to account for signal delay.

Figure 3:
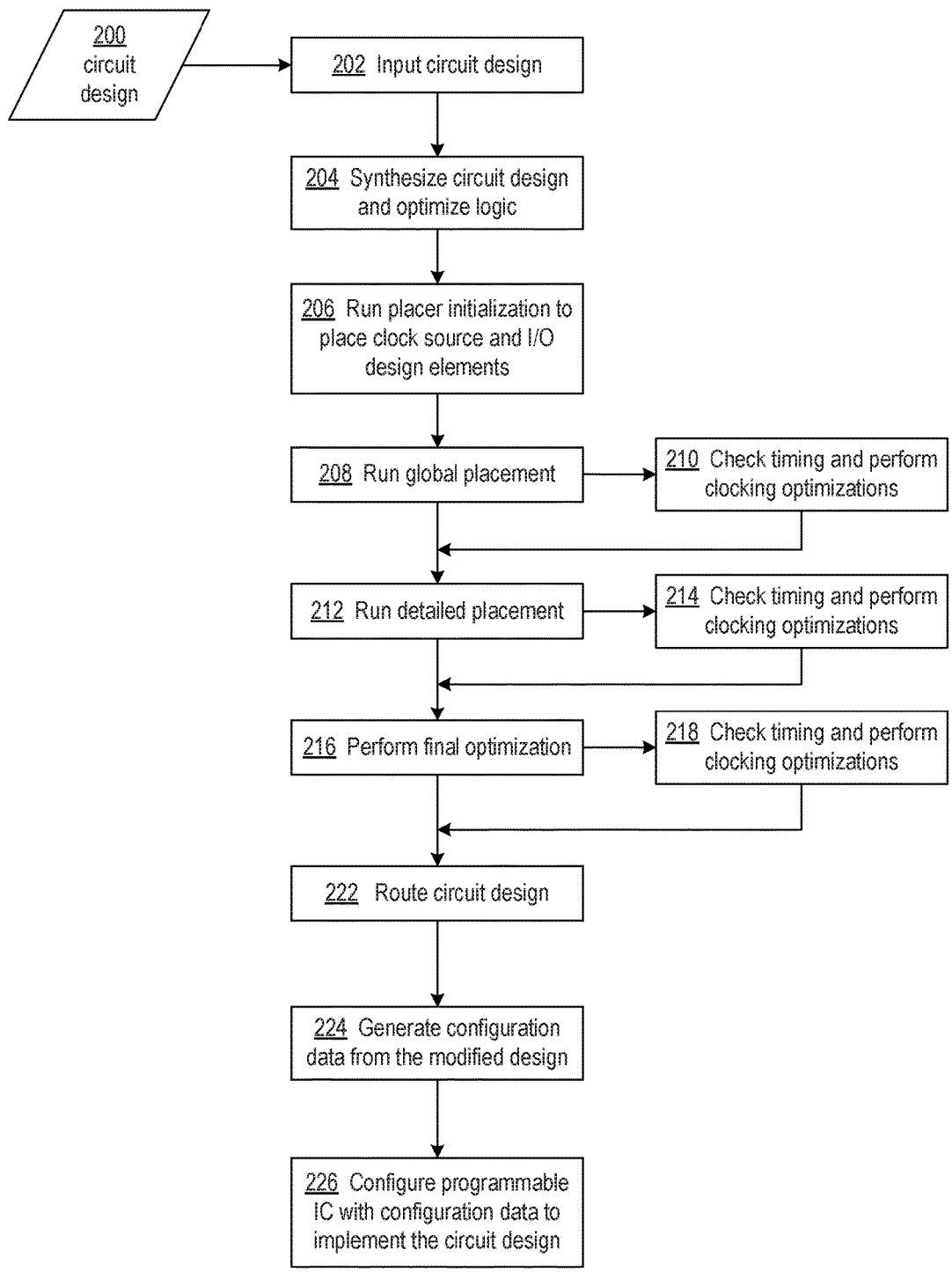
FIG. 3 shows a flowchart of a process for generating a circuit from a circuit design and attempting to automatically eliminate timing violations resulting from clock skew in balanced clock trees of the circuit design.

FIG. 3 shows a flowchart of a process for generating a circuit from a circuit design and attempting to automatically eliminate timing violations resulting from clock skew in balanced clock trees of the circuit design. An electronic design automation (EDA) tool executing on a processor inputs circuit design 200 at block 202. The EDA tool synthesizes the circuit design and optimizes logic at block 204. Once synthesized, at block 206 the EDA tool runs placer initialization that establishes locations on the target device for clock sources and I/O circuit elements of the circuit design.

At block 208, the EDA tool runs a global placement process. The global placement process attempts to determine a well spread, ideally with no overlaps, placement of the cells for a given netlist, such that the placement attains the required objectives such as wirelength minimization or timing specifications. Some global placement algorithms include analytic techniques which approximate the wirelength objective using quadratic or nonlinear formulations, partitioning-based placement algorithms and stochastic techniques. The global placement also generates initial clock trees for the circuit design.

The EDA tool at block 210 runs a static timing analysis process on the globally placed circuit design and performs various clocking optimizations if timing constraints are not satisfied. The clock optimizations of block 210 are described further in FIGS. 4-16. The clocking optimizations include converting a clock tree having a single clock root to a clock tree having multiple clock roots, converting the centered clock root(s) of a balanced clock to a clock tree in which the clock root(s) are not centered, changing programmable delay values associated with branches of a balanced clock tree, and moving the clock roots of balanced clock trees nearer to one another to remedy cross domain clock skew between multiple balanced clock trees.

At block 212, the EDA tool runs a detailed placement process, and at block 214 repeats the operations of running a static timing analysis on the detailed placed circuit design and performing various clocking optimizations if timing constraints are not satisfied. The detailed placement process attempts to legalize the result from global placement with as little cell movement as possible. In addition, detailed placement has more concrete objectives on meeting the timing specifications and minimizing wirelength.

A final optimization is performed by the EDA tool at block 216. The final optimization process attempts to meet the timing specification of the design by iteratively improving the placement of the worst timing critical path.

After the final optimization, the EDA tool performs final timing check and clocking optimization at block 218, as in blocks 210 and 214.

If the placed circuit design after the final optimization of block 216 and clocking optimizations of block 218 satisfies timing constraints, the EDA tool routes the circuit design at block 222. At block 224, configuration data is generated from the placed-and-routed circuit design. For example, bitstream generation tools may be executed on a processor to generate configuration data for a programmable IC having a field programmable gate array (FPGA). At block 226, a programmable IC may be configured with the configuration data, thereby creating clock trees in a circuit that operates according to the circuit design.

Figure 4:
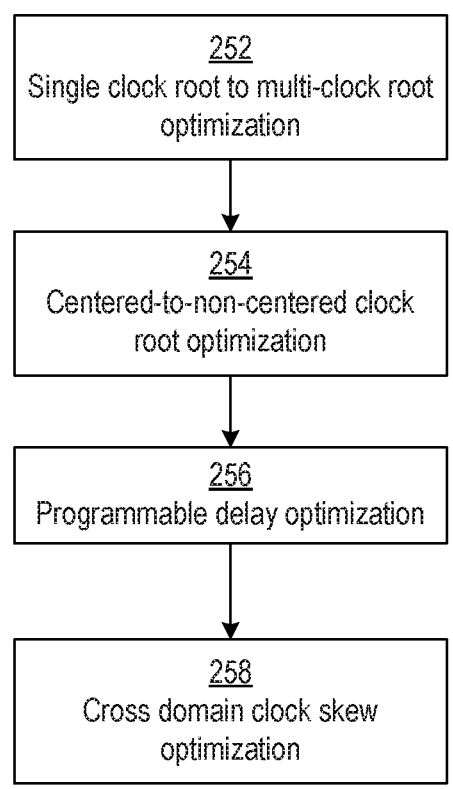
FIG. 4 shows a flowchart of a process for modifying clock trees of a circuit design to fix timing violations caused by clock skew.

FIG. 4 shows a flowchart of a process for modifying clock trees of a circuit design to fix timing violations caused by clock skew. At each of blocks 210, 214, and 218 of the process of FIG. 3, the EDA tool may perform one or more of the clocking optimizations of blocks 252, 254, 256, and 258 on the circuit design, depending on which optimization is applicable to critical paths found in the circuit design. FIGS. 5-16 further explain the clocking optimizations of blocks 252, 254, 256, and 258.

A path includes a sequential circuit element, such as a flip-flop, and a second sequential circuit element that has a data input pin coupled to the data output pin of the first device, either directly or through combinational logic. The first and second sequential circuit elements may be enabled by the same or different clock signals. The first device is referred to as the "path source", and the second device is referred to as the "path destination." As both the path source and path destination are clocked circuit elements, the path source and path destination may be referred to as "clock loads" or "loads" for brevity.

A "critical path," generally refers to a signal path that does not meet a timing requirement. The criticality of a path can be measured by the "slack" of the path. Slack refers to the difference between the time a signal is expected to arrive at a particular destination (required time) to meet established design constraints and the actual time, or estimated time as determined by the design tool, at which the signal arrives (arrival time). The more negative the slack, the more critical the path. The path having the worst negative slack (least of the slack values) is the most critical path.

At block 252, the EDA tool identifies critical paths of the circuit design and selectively converts a clock tree(s) having a single clock root to a clock tree(s) having multiple clock roots, as a single clock root centered on a spine may not produce suitable timing for all the clock loads connected to the spine.

At block 254, the EDA tool identifies critical paths of the circuit design and selectively converts a clock tree(s) having a clock root(s) centered on a spine(s) to a clock tree(s) having an off-center clock root(s) on the spine(s).

At block 256, the EDA tool identifies critical paths of the circuit design and selectively changes programmable delay values associated with branches of a balanced clock tree(s).

At block 258, the EDA tool identifies critical paths of the circuit design in which cross domain clock skew between multiple balanced clock trees is a factor and selectively moves the clock roots of the balanced clock trees nearer to one another.

Figure 5:
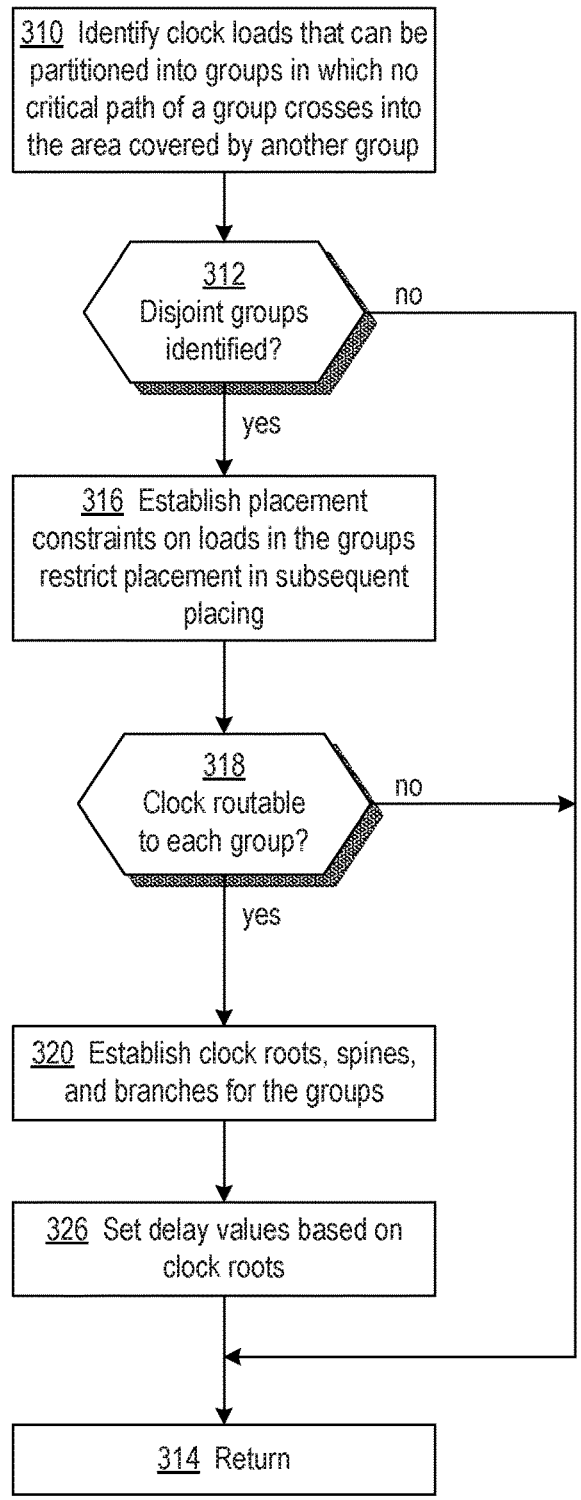
FIG. 5 shows a flowchart of a process for attempting to fix a clock skew timing violation by transforming a clock tree from having single clock root to having multiple clock roots.
Figure 6:
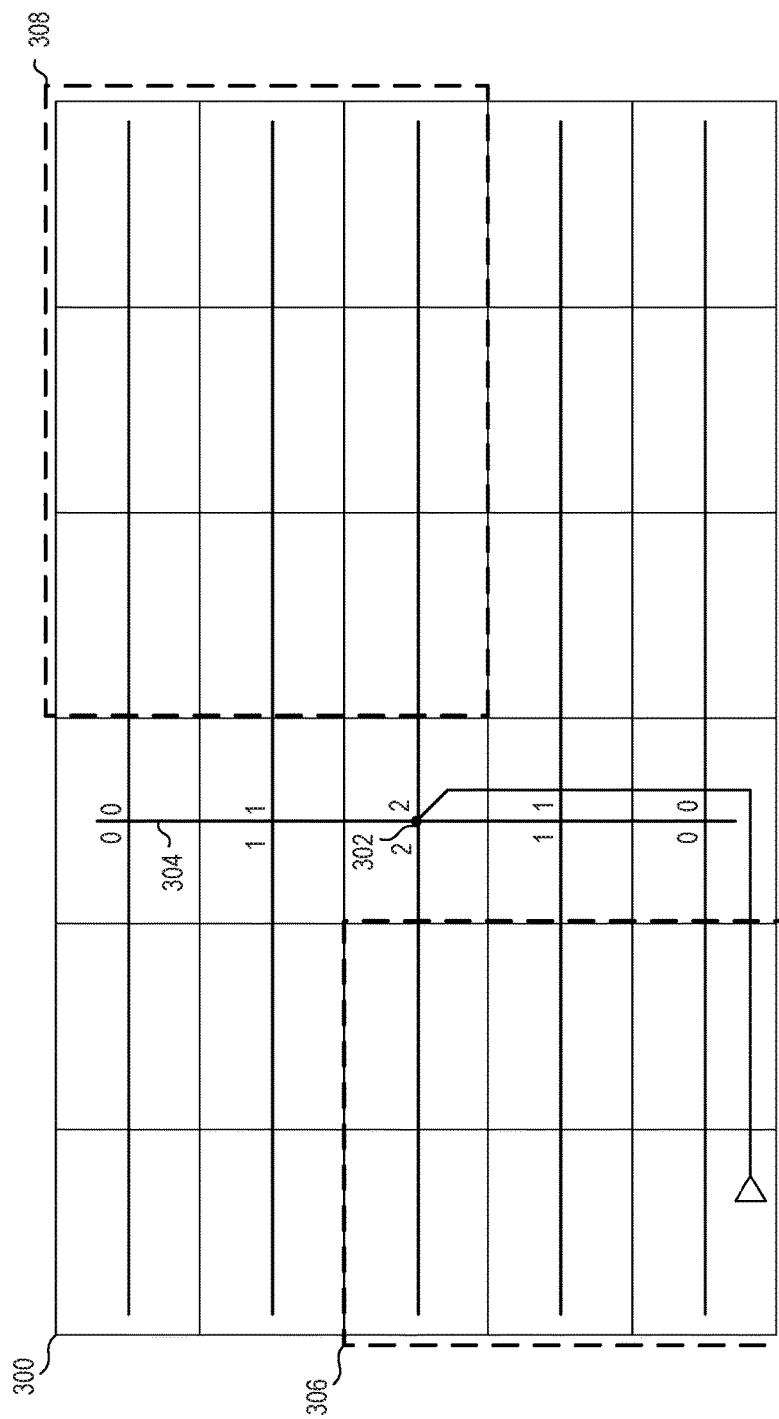
FIG. 6 shows an example clock tree having a single clock root and timing violations in two areas.
Figure 7:
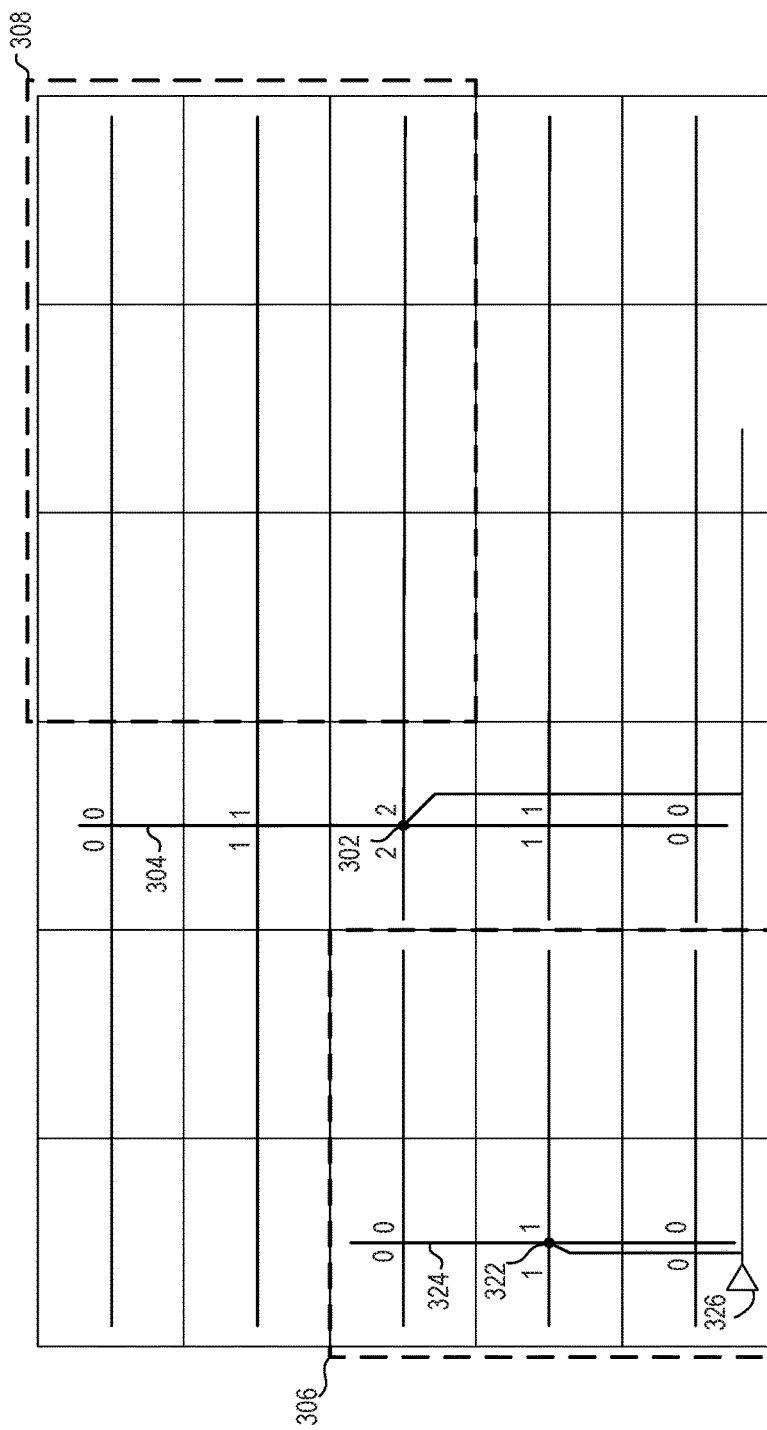
FIG. 7 shows a conversion of the single clock root of FIG. 6 into multiple clock roots.

FIG. 5 shows a flowchart of a process for attempting to fix a clock skew timing violation by transforming a clock tree from having single clock root to having multiple clock roots. The process of FIG. 5 is described in conjunction with the examples shown in FIGS. 6 and 7. FIG. 6 shows an example clock tree having a single clock root and timing violations in two areas, and FIG. 7 shows a conversion of the single clock root of FIG. 6 into multiple clock roots.

In the balanced clock tree of FIG. 6, the clock tree reaches all 30 regions of the device 300. The clock root 302 is centered on spine 304, and programmable delays are set to balance the clock signal crossing two regions above and below the root region. Delay-and-buffer circuits are not shown to simplify the drawing. In the example, the design elements are placed such that critical paths are enclosed within the area marked by dashed blocks 306 and 308.

Returning now to FIG. 5, at block 310, the EDA tool identifies clock loads that can be partitioned into groups in which no critical path of a group crosses into the area covered by another group. In the example of FIG. 6, two such groups of critical paths may be identified. One group of critical paths is wholly contained in area 306, and another group of critical paths is wholly contained in area 308. If no critical path crosses between areas 306 and 308, then the clock tree of FIG. 6 is not beneficial for clock skew and timing.

At block 312, if there are no disjoint groups of critical paths identified, the process returns at block 314 to the process of FIG. 4 to check for other clock optimizations. Otherwise, at block 316, the EDA tool establishes placement constraints on loads in the groups so that placement is restricted in subsequent placing operations.

At block 318, the EDA tool determines whether or not the clock signal is routable to the clock loads in each group. In some instances, the clock signal may not be routable to the clock loads in a group due to congestion, for example. If the clock signal cannot be routed, the process returns at block 314 as described above. Otherwise, at block 320, the EDA establishes a separate clock root for each group, along with the spine and branches for connecting to the clock loads in the clock region. The clock root is placed near the center of the clock loads, with availability of clock routing and distribution tracks limiting exact placement. The multiple, separate clock root and clock spines are shown in the example of FIG. 7. Clock root 302 remains on spine 304, and an additional clock root is 322 and spine 324 are established. Both clock roots 302 and 322 are connected to clock source 326.

Returning now to block 326 of FIG. 5, the delay values on horizontal distribution tracks are generated and set based on the position of the clock root on the clock spines. For example, the delay values may balance the delays as shown in FIG. 7. The programmable delay values on the horizontal distribution tracks connected to spine 304 need not change from the values in FIG. 6. The programmable delay values on the horizontal distribution tracks connected to spine 324 are balanced from the root. The EDA tool then returns at block 314 to check for further clock optimizations.

In an alternative implementation, the EDA tool may provide the user with an interface to specify partitions, and the EDA tool automatically generates the clock tree. User specification of partitions may be useful for in IC structures involving Stacked Silicon interconnect technology (SSIT) in which a global tree spans all devices, with a separate clock rooted in each device.

Figure 8:
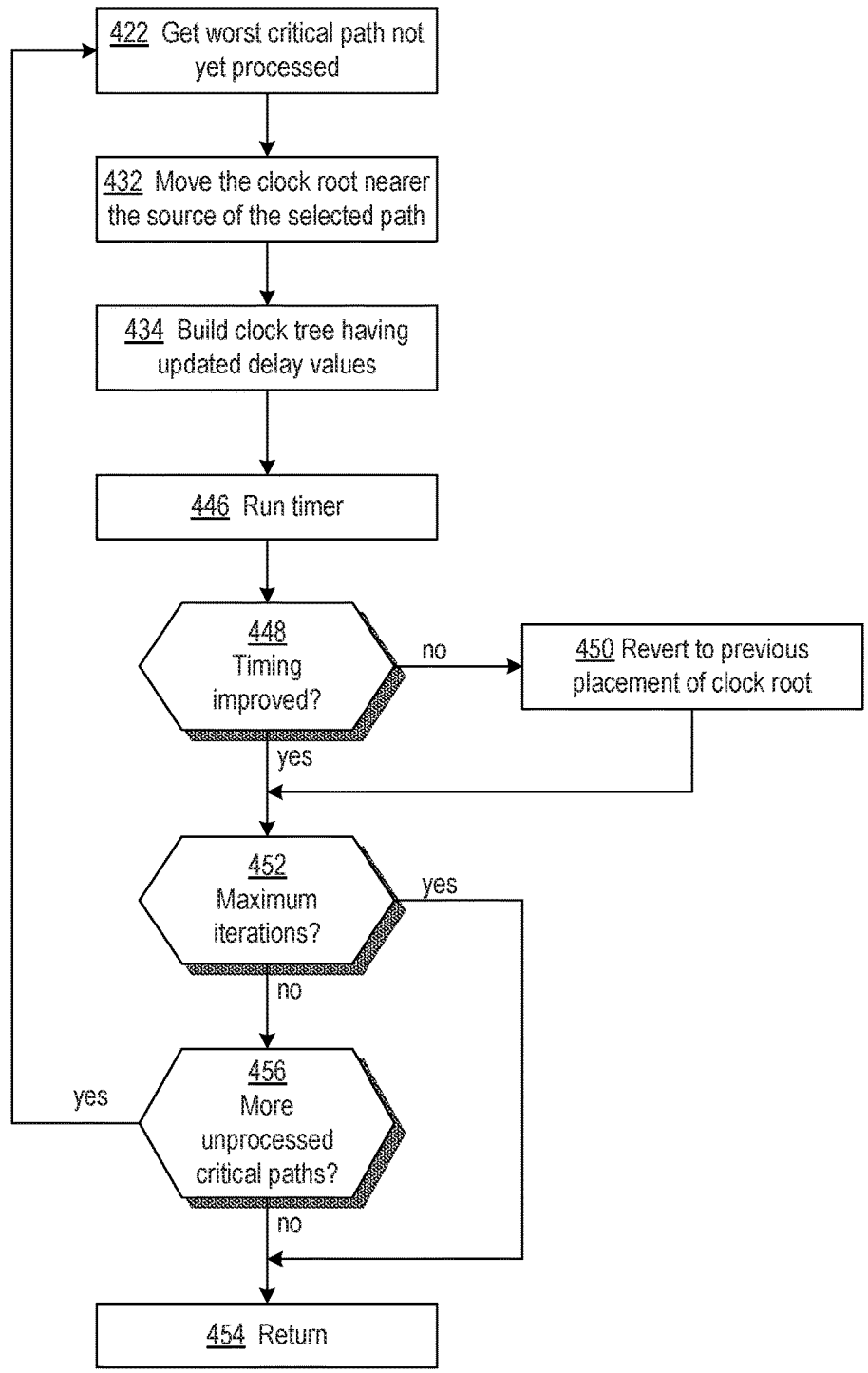
FIG. 8 shows a flowchart of a process for attempting to fix a clock skew timing violation by transforming a clock tree from having a centered clock root to having a non-centered clock root.
Figure 9:
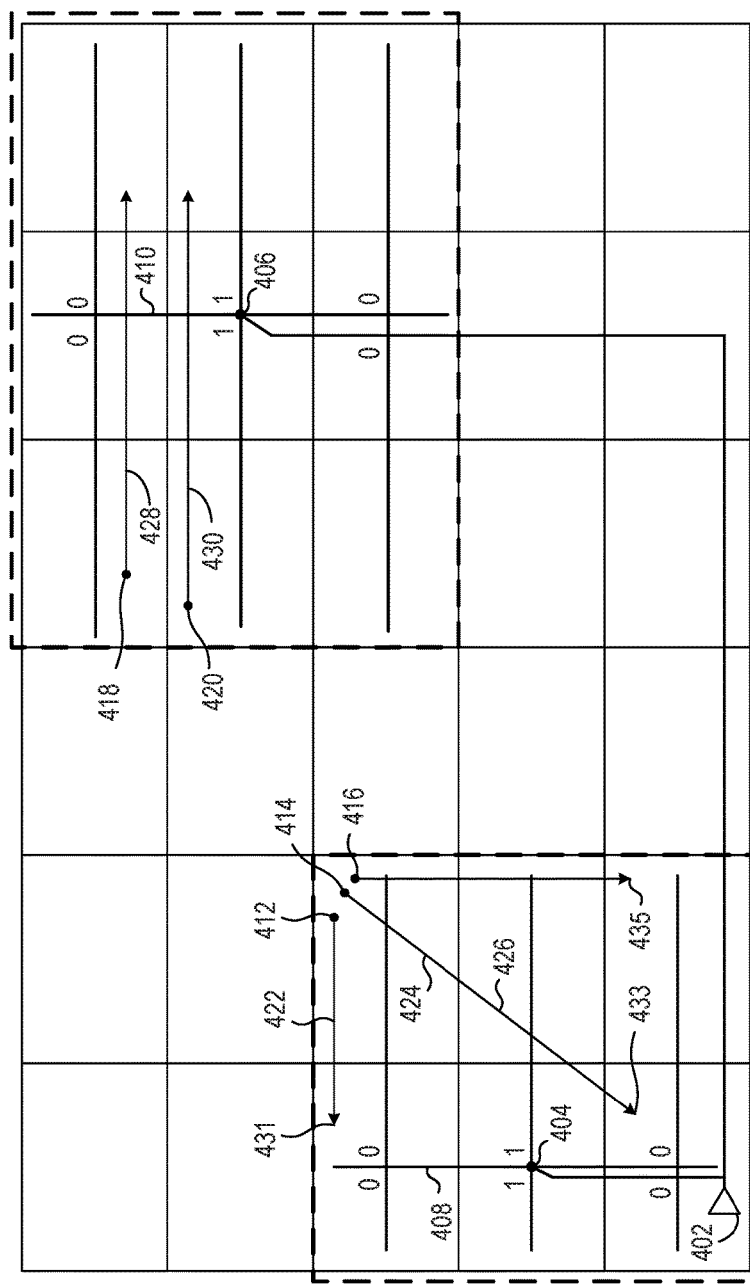
FIG. 9 shows an example clock tree having two centered clock roots.
Figure 10:
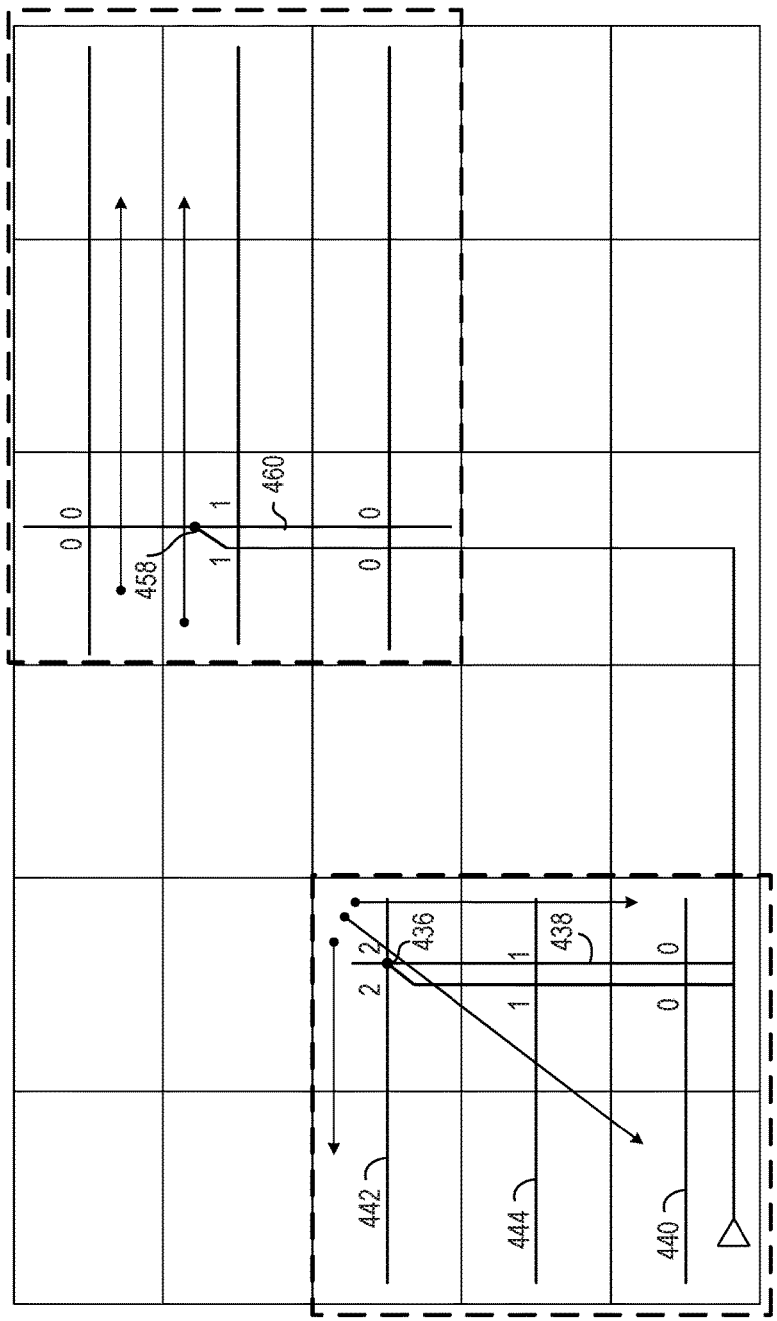
FIG. 10 shows a conversion of the clock tree of FIG. 9 having centered clock roots into a clock tree having non-centered clock roots.

FIG. 8 shows a flowchart of a process for attempting to fix a clock skew timing violation by transforming a clock tree from having a centered clock root to having a non-centered clock root. The process of FIG. 8 is described in conjunction with the examples shown in FIGS. 9 and 10. FIG. 9 shows an example clock tree having two centered clock roots, and FIG. 10 shows a conversion of the clock tree of FIG. 9 having centered clock roots into a clock tree having non-centered clock roots.

The clock tree of FIG. 9 has clock source 402 connected clock roots 404 and 406, which are centered on spines 408 and 410, respectively. The clock roots are centered in that the clock roots are at or near the midpoint of the spines. In some instances the centered clock roots may create timing problems where the sources of multiple critical paths are proximate one another in an area that does not include the clock root.

The example of FIG. 9 shows critical paths having sources 412, 414, and 416 relative to clock root 404, and critical paths having sources 418 and 420 relative to clock root 406. The arrows at the ends of the critical paths represent the destinations of the paths. For example, destinations 431, 433, and 435 are coupled to sources 412, 414, and 416, respectively. Moving the clock roots 404 and 406 nearer the sources of the respective groups of critical paths may reduce clock skew.

Turning now to FIG. 8, at block 422 the EDA tool gets the worst critical path that has not yet been processed. The most critical path may be the path having the most negative slack value. In the example of FIG. 9, paths 422, 424, and 426 are the critical paths relative to clock root 404, and paths 428 and 430 are the critical paths relative to clock root 406. For the one of the critical paths that is most critical, the EDA tool replaces the previously placed clock root with a new clock root that is nearer the source of the selected path. For example, if path 424 is the most critical path, the clock root 404 is effectively moved by replacing clock root 404 with a new clock root that is nearer source 414 at block 432 (FIG. 5), and the clock tree is rebuilt using a possible different spine and updated delay values at block 434.

Turning to FIG. 10, a new clock root 436 replaces the old clock root 404 (FIG. 9). The programmable delay values are updated according to the location of the clock root 436 on a new spine 438. The horizontal distribution track 440 farthest from the clock root is two regions away, thereby causing the EDA tool to assign a delay value of 2 to the horizontal distribution track 442 at the clock root, a delay value of 1 to the next horizontal distribution track 444, and a delay value of 0 to horizontal distribution track 440.

At block 446, the EDA tool runs a timer (static timing analysis), and at decision block 448 determines whether or not timing is improved. Timing is improved if timing of the critical path has been improved. If timing has not improved, the EDA tool at block 450 reverts the circuit design back to the previous placement of the clock root. For example, the EDA tool reverts from the new clock root 436 and clock spine 438 of FIG. 10 to the previous clock root 404 and clock spine 408 of FIG. 9.

The EDA tool continues at decision block 452 to check whether or not a maximum number of iterations of the process of FIG. 8 have been performed. The maximum number of iterations is set to keep the EDA tool from looping indefinitely. If the maximum number of iterations has been reached, the process returns at block 454 to the process of FIG. 4 to check for other clock optimizations.

At decision block 456, the EDA tool checks for more unprocessed critical paths. If there are no more unprocessed critical paths, the process returns at block 454 to the process of FIG. 4 to check for other clock optimizations. Otherwise, the EDA tool returns to block 422 to get the most critical path to process next. In the example of FIG. 9, one of critical paths 428 or 430 may be the next critical path to process, and the clock root 406 and spine 410 may be replaced with the new clock root 458 and clock spine 460 as shown in FIG. 10. Note that the delay values need not change as the clock root remains at the midpoint of the spine 460.

In placements having critical paths directed toward the clock root, clock skew may be problematic in the balanced clock tree. The balanced delay values may introduce illegal clock skew due to a larger delay imposed on the center horizontal track that provides the clock signal to the destinations of the critical paths.

Figure 11:
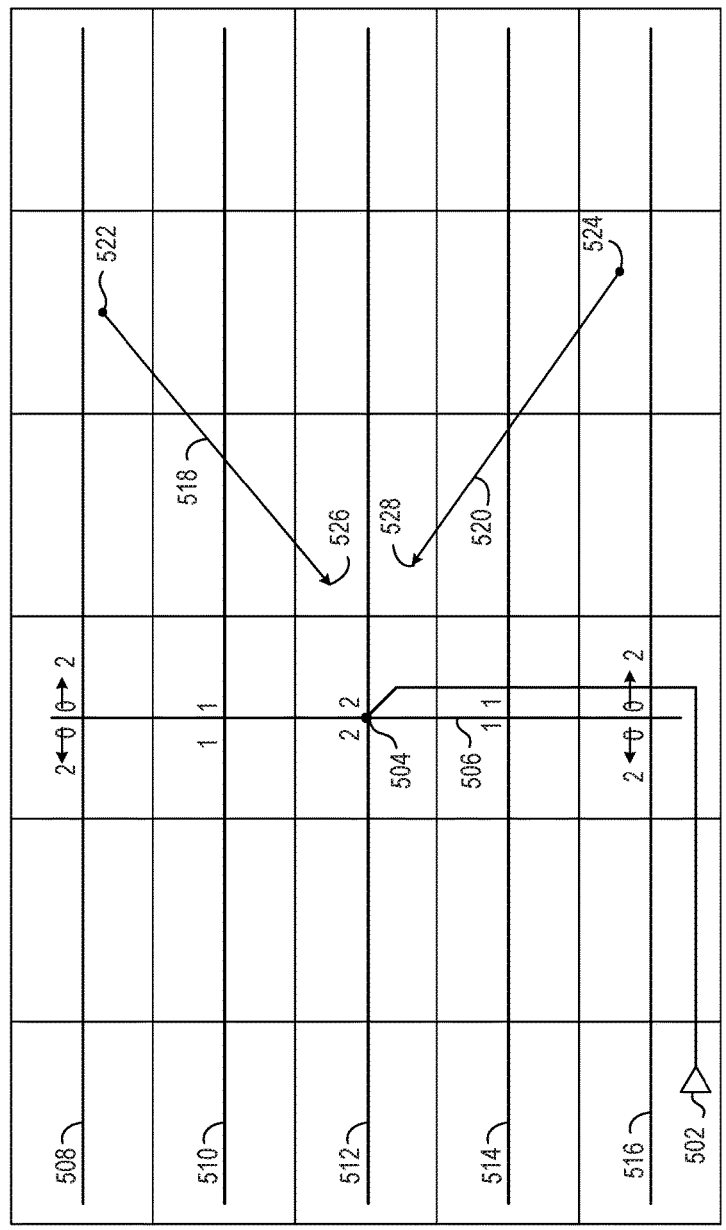
FIG. 11 shows an example of a balanced clock tree having critical paths directed toward the clock root.
Figure 12:
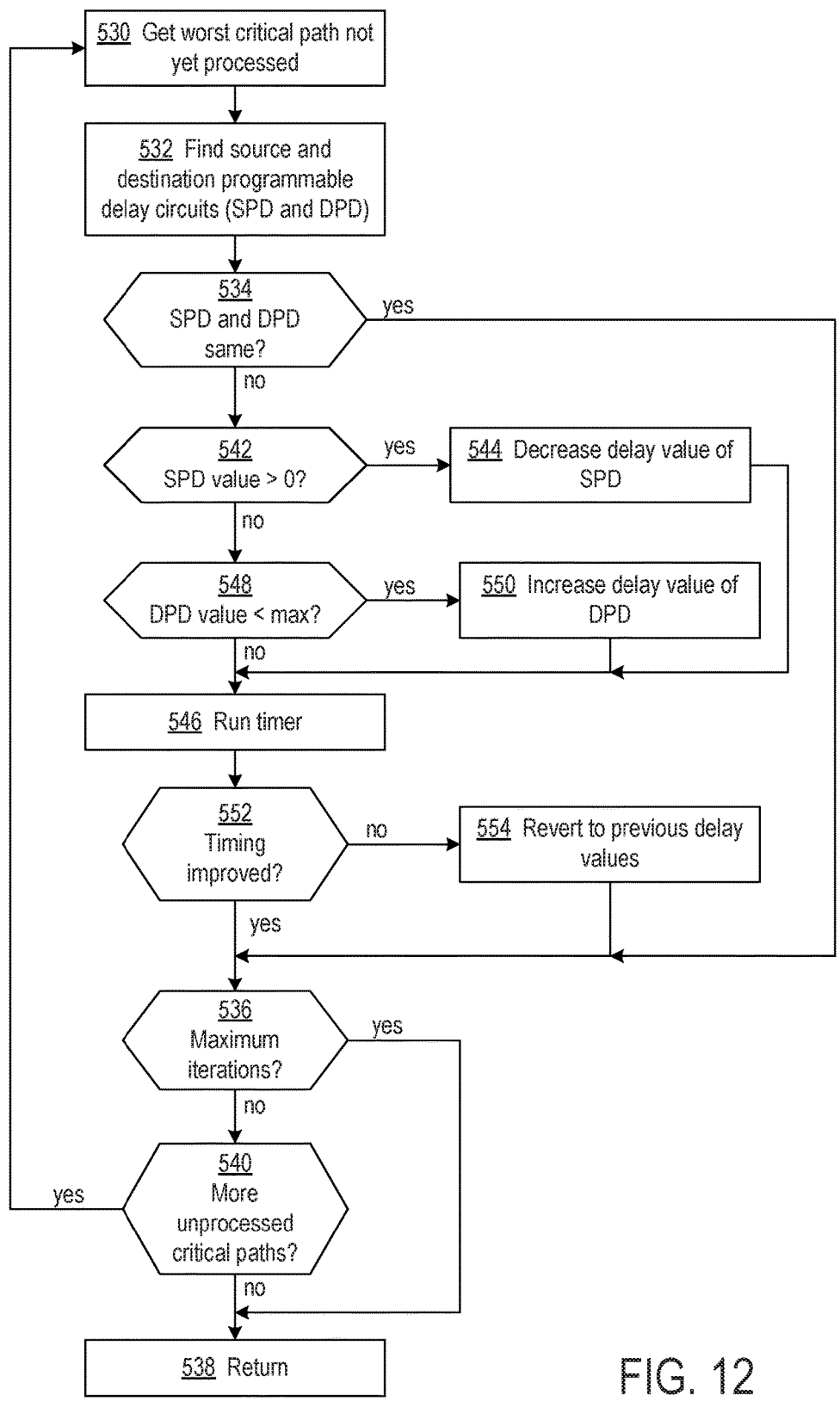
FIG. 12 is a flowchart of a process of changing one or more of the programmable delay values to alleviate clock skew.

FIG. 11 shows an example of a balanced clock tree having critical paths directed toward the clock root, and FIG. 12 is a flowchart of a process of changing one or more of the programmable delay values to alleviate clock skew. The clock tree of FIG. 11 includes clock source 502 that is connected to clock root 504. The spine 506 spans the entire device and is connected to horizontal routing tracks 508, 510, 512, 514, and 516. The initial delay values established are 2 for horizontal routing track 512, 1 for horizontal routing tracks 510 and 514, and 0 for horizontal routing tracks 508 and 516. Critical paths 518 and 520 have sources 522 and 524, respectively. The destinations 526 and 528 of the critical paths 518 and 520 are nearer the clock root 504 than are the sources 522 and 524.

Turning now to FIG. 12, the EDA tool attempts to reduce clock skew by first reducing the clock delay at the source of the critical path. If the delay added at the source is already zero, then the destination programmable delay is increased. Changing the delay value associated with the source is given priority over changing the delay value associated with the destination. The source is considered first, because reducing the clock delay at the source will reduce the chances of introducing a higher max-min delay delta as such delay tends to increase with higher programmable delay values.

At block 530, the EDA tool gets the worst critical path, and at block 532 determines the source and destination programmable delay circuits (SPD and DPD). Decision block 534 determines whether or not the SPD and DPD are the same. In other words, the EDA tool determines whether or not the same delay circuit delays the clock signal to both the source and destination of the critical path. If the SPD and DPD are the same, the process continues at decision block 536, where the EDA tool determines whether the process of FIG. 12 has reached the maximum number of iterations. If so, the process continues at block 538 where processing returns to FIG. 4 to check for more possible clock optimizations. Otherwise, the process continues at decision block 540 to determine whether there are more unprocessed critical paths. If there are more unprocessed critical paths, the process returns to block 530. Otherwise, the process continues at block 538.

Returning now to decision block 534, if the SPD and DPD are not the same, the EDA tool determines at decision block 542 whether the programmed delay value of the SPD is greater than 0. If so, at block 544 the programmable delay value of the SPD is decreased. In an example implementation, the programmable delay value of the SPD is decremented by 1. The example clock tree of FIG. 11 shows the reduction of the delay values associated with horizontal track 508 and 516 being increased from 0 to 2. Note that another iteration of the process loop of FIG. 12 may be required to increase the delay value to 2. The process then continues at block 546.

If the delay value of the SPD is not greater than 0, at decision block 548 the EDA tool checks the delay value of the DPD. If the delay value of the DPD is less than a maximum allowed delay value, at block 550 the EDA tool increases the delay value of the DPD, such as by incrementing the delay value by 1. The process then continues at block 546.

At block 546, the EDA tool runs a timer (static timing analysis), and at decision block 552 determines whether or not timing is improved as described above. If timing has not improved, the EDA tool at block 554 reverts the SPD or DPD delay value back to the previous delay value.

In cross domain clock (CDC) paths, the source and destination sequential circuit elements of a path are clocked by different clock signals. Oftentimes the loads of CDC paths are in different clock regions, and the clock roots for the different clock sources are in different regions. Clock trees may be established without regard to the potential for critical paths involving the different clock signals. Thus, the clock delays for clocks involved in CDC paths could vary significantly and present clock skew problems. In addition, programmable delay settings on each clock tree can aggravate the CDC skew. For example, the different clock signals involved in a CDC path may have different programmed delay values for clock loads in the same clock region.

CDC skew may also be problematic in designs having a circuit block that inputs and uses multiple different clock signals. Examples of such circuit blocks include those instantiated in a circuit design from a library of logic blocks, wherein each logic block has a predefined function. A specific example is a Peripheral Component Interconnect express (PCIe) logic block that uses multiple different clocks. In order for a circuit block to operate correctly, the clock signals must satisfy a max skew requirement. That is, the skew between a combination of any of the multiple clock signals and one of the clock signals that is the reference clock must be less than a maximum skew. The clock trees carrying the clock signals to the circuit block will likely be connected to other clock loads, causing the clocking topology to be different and causing different skews at the clock input pins of the circuit block.

Figure 13:
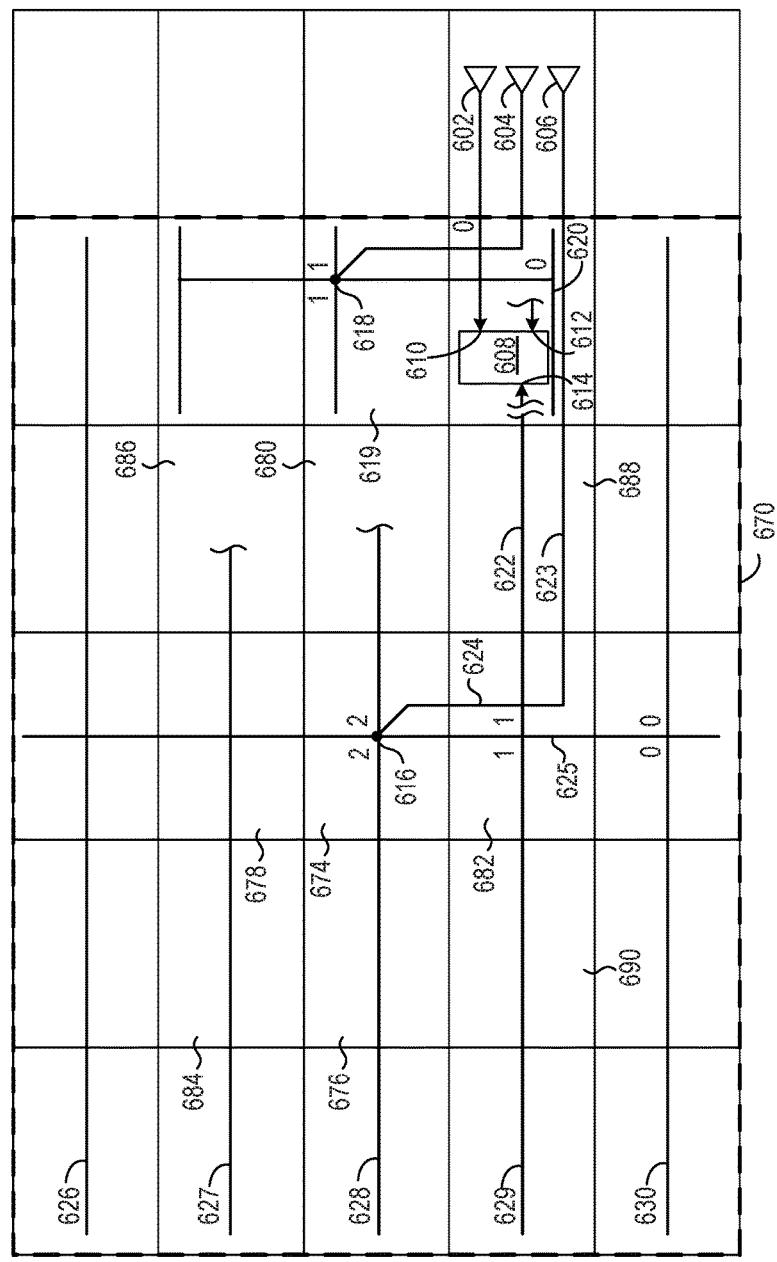
FIG. 13 shows an example of a CDC routing topology for a circuit block.
Figure 14:
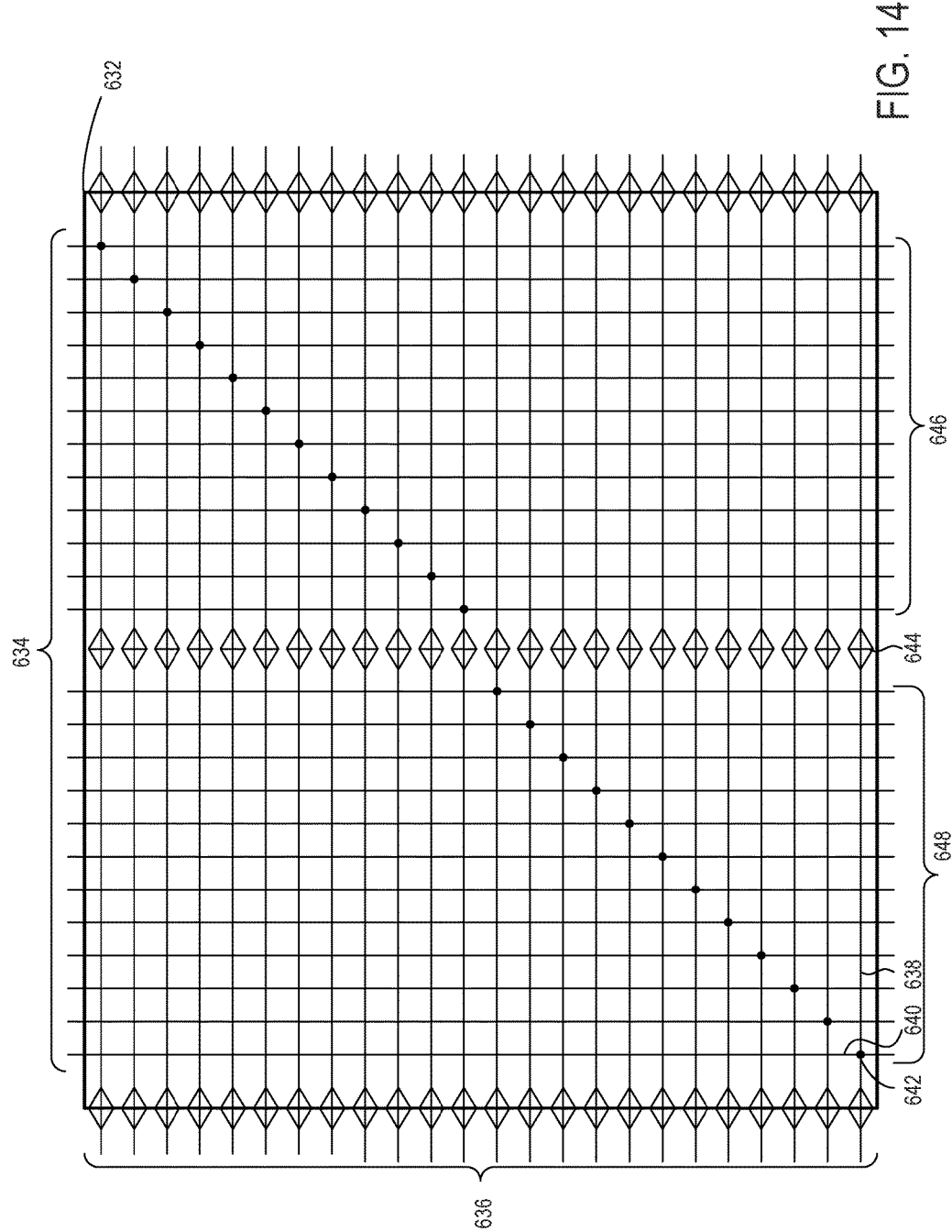
FIG. 14 shows clock routing resources considered in restructuring a CDC clock tree.
Figure 15:
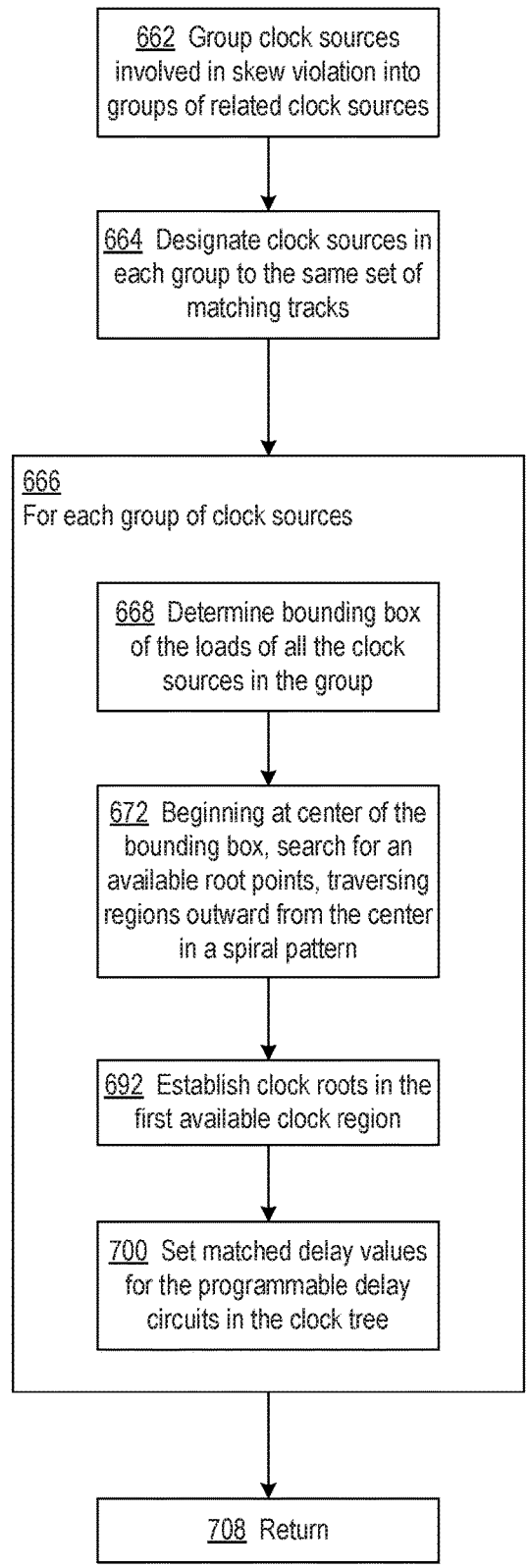
FIG. 15 shows a process of restructuring a CDC clock tree to reduce clock skew.
Figure 16:
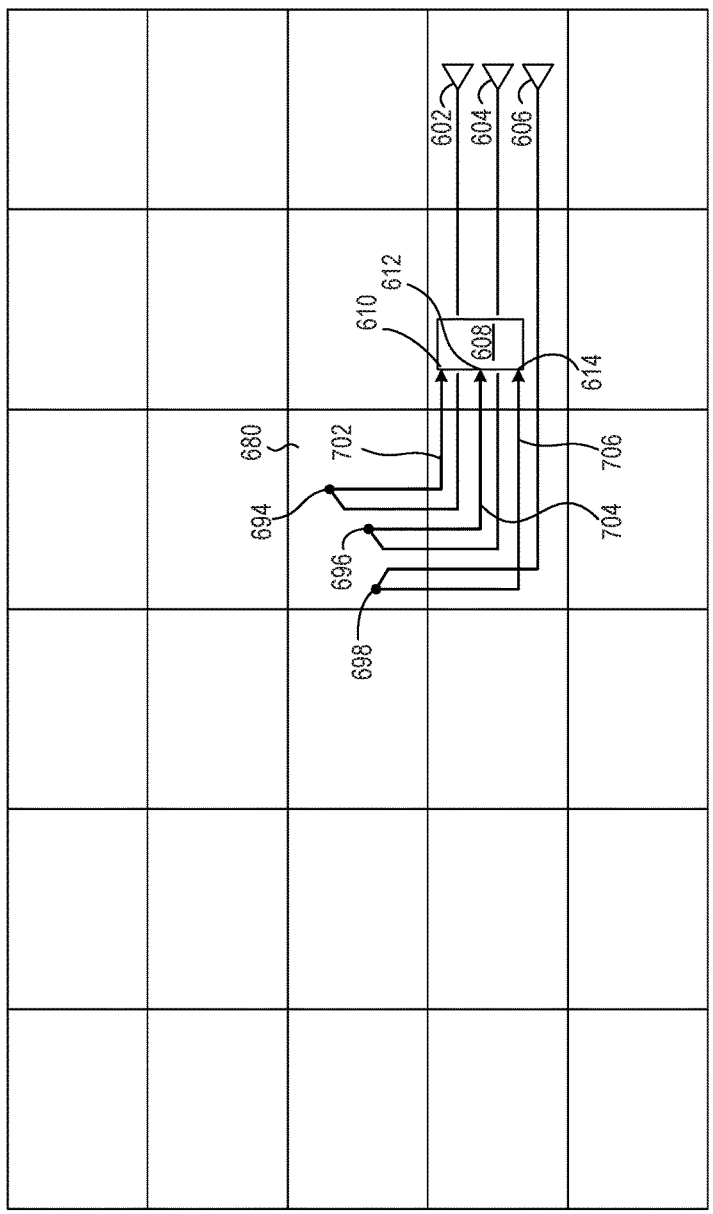
FIG. 16 shows a restructured clock tree for the circuit block of FIG. 13.

FIG. 13 shows an example of a CDC routing topology for a circuit block, FIG. 14 shows clock routing resources considered in restructuring a CDC clock tree, FIG. 15 shows a process of restructuring a CDC clock tree to reduce clock skew, and FIG. 16 shows a restructured clock tree for the circuit block of FIG. 13.

Turning now to FIG. 13, a clock tree includes clock sources 602, 604, and 606 that are connected to clock input pins of circuit block 608. Clock source 602 is connected to clock pin 610, clock source 604 is connected to clock pin 612, and clock source 606 is connected to clock pin 614. The clock trees that provide clock signals to the three clock pins are different because of the distribution of the respective sets of loads on the device. Clock source 606 connects to clock root 616 near the center of the device, and clock source 604 connects to clock root 618. Clock source 602 does not use the clock routing network, because the loads are placed adjacent to the clock source, in which case the clock root is the clock source. As there is no clock tree for clock pin 610, the programmed delay value is assumed to be 0. The delay value at clock pin 612 is 0, because the programmed delay for horizontal track 620 is 0, and the delay value at clock pin 614 is 1 because the programmed delay value on horizontal track 622 is 1. Though the delay values at clock pins 610 and 612 are 0, those skilled in the art will recognize that there would be some amount of actual delay at clock pins 610 and 610. The different clock path delays from the clock trees and the different programmable delay values can lead to max skew violations at the circuit block 608.

Horizontal routing track 623 is connected to vertical routing track 624, vertical routing track 624 is connected to vertical distribution track 625, and vertical distribution track 625 is connected to horizontal distribution tracks 626, 627, 628, 629, and 630.

The disclosed approaches that address CDC skew and max skew violations match clock tree topologies for the involved clocks. The EDA tool factors the structure of the clock routing resources into constructing the matching clock tree topologies.

FIG. 14 shows horizontal and vertical clock routing tracks in a clock region of a programmable IC. Clock region 632 includes 24 vertical routing tracks 634 and 24 horizontal routing tracks 636. Though not shown, the clock region also includes 24 vertical distribution tracks and 24 horizontal distribution tracks. The routing tracks and distribution tracks span all clock regions in the device as shown in FIG. 1. The clock routing tracks may be program mably connected. Each horizontal routing track can be program mably connected to one and only one of the vertical routing tracks. For example, horizontal routing track 638 may be connected to vertical routing track 640 via programmable interconnection point 642.

To establish a clock root in a region other than the region in which the clock source is placed, a horizontal routing track is used first to connect the clock source (not shown) to clock routing resources. The horizontal routing track may then be connected to a vertical routing track that spans the region targeted for the clock root. The vertical routing track is programmably connected to the vertical distribution track in the targeted region to establish the clock root.

The horizontal routing tracks are re-buffered in the middle of each clock region. For example, the clock signal on horizontal routing track 638 may be re-buffered by bi-directional buffer circuit 644. Depending on the direction of a routed clock signal, the connection between a horizontal routing track and a vertical routing track may be before or after the bi-directional buffer circuit. As shown in FIG. 14, one set of 12 horizontal routing tracks may be programmably connected to the vertical routing tracks on the left side of the bi-directional buffer circuit, and the other set of 12 horizontal tracks may be program mably connected to the vertical routing tracks on the right side of the bi-directional buffer circuit. To reduce skew between two clock signals carried into the region in the same direction and that switch from horizontal routing tracks to vertical routing tracks in the same region, the switch from horizontal routing tracks to vertical routing tracks should be on the same side of the bi-directional buffer circuits. The group of vertical routing tracks that may be programmably connected to the horizontal routing tracks on the same side of the bi-directional buffer circuit may be referred to here as "matching" tracks. For example, vertical routing tracks 646 are matching tracks and vertical routing tracks 648 are matching tracks.

Turning now to FIG. 15, a flowchart of a process of restructuring a CDC clock tree to reduce clock skew. At block 662, the EDA tool groups clock sources involved in a skew violation into groups of related clock sources. For example, if two clock sources supply clock signals to two sequential circuit elements, and clock skew between the two clock sources creates a setup or hold-time violation, the two clock sources are identified and designated as members of a group or set of related clock sources. In another example, if multiple clock signals are routed to the same circuit block and placement of the clock sources or the programmed delay values create a max skew violation, the multiple clock sources are identified and designated as members of another group or set of related clock sources.

At block 664, the EDA tool assigns the clock sources in the group to the same set of matching tracks. With reference to FIG. 14, the clock sources in a group may be assigned to either set 646 of matching tracks or to set 648 of matching tracks. The set of matching tracks is chosen based on the clock source location. If the clock sources are not locked, then the algorithm is free to choose either set. However, if at least one of the clocks in the set is locked, depending on the location of the clock source one of the two matching sets is chosen. For example, a clock region containing an IO bank may include a maximum of 24 clock sources. Some clock source types have a one-to-one mapping to global routing tracks. For these sources, the top 12 belong to one track set and the lower 12 belong to the other track set. If a clock is constrained to use a specific clock source, then the global routing track corresponding to that source is known. The EDA tool will choose the corresponding track set. If the sources are not locked, then the tool is free to choose either track sets.

The EDA tool performs the processing of block 666 for each group of clock sources. At block 668, the EDA tool determines the bounding box of the loads of all the clock sources in the group. For example, the bounding box is a rectangular area that includes the clock regions of the clock loads. Referring to FIG. 13, the bounding box is shown as dashed block 670.

At block 672, the EDA determines which clock region within the clock root region should be used for establishing new clock roots for the clock sources of the group. The search for an available clock root region begins at the center clock region of the bounding box. In the example of FIG. 13, clock region 674 is the center clock region of the bounding box. The selected clock region may be proximate the center of the bounding box if there are an even number of rows and/or columns of clock regions in the bounding box. That is, in a bounding box having an even number of clock regions in a row and/or column there is no center clock region, and one of the clock regions touching the center point of the bounding box may be selected. If the region has clock routing resources, i.e., clock routing and distribution tracks, available for establishing clock roots on the same set of matching tracks, region 674 may be selected as the region in which the clock roots are established. Otherwise, the search for a clock root region continues with one of the regions adjacent to region 674, for example, one of regions 676, 678, 680, or 682. If the next one of regions 676, 678, 680, or 682 also does not have sufficient clock routing resources to establish the clock roots, the search for a clock root region continues with one of the regions 684, 686, 688, or 690 touching a corner of clock region 674. The search process continues with clock regions surrounding the center clock region 674 until either a suitable clock region is found or all the clock regions have been checked. If none of clock regions 676, 678, 680, 682, 684, 686, 688, or 690 have available clock root resources, the search continues with the clock regions surrounding 676, 678, 680, 682, 684, 686, 688, and 690. The search continues until either an available clock region is found or there are no further clock regions within the bounding box to check.

At block 692, the EDA tool establishes respective clock roots, spines, and sets of branches for the clock sources in the clock region first found to have available clock network resources. Turning briefly to FIG. 16, the clock region selected to be the clock root region for the clock sources 602, 604, 606 from the example of FIG. 13, is clock region 680. Clock roots 694, 696, and 698 are established for and connected to clock sources 602. 604, and 606, respectively.

FIG. 16 shows a simplified view of the modified clock trees in order to not obscure the relevant features. Specifically, the full extent of the spines from clock roots 694, 696, and 698 are not illustrated, and the full complement of branches connected to the spines is not shown. Also, in order to simplify illustration, the side of the circuit block 608 on which the connections to clock pins 610 and 612 are shown in FIG. 16 is the opposite side from FIG. 13, even though the actual pin positions are the same for both figures. The horizontal routing tracks from clock sources 602 and 604 pass behind circuit block 608.

Matched delay values are set on the restructured clock trees at block 700 by the EDA tool. That is, for the branch at the clock root, the EDA tool sets the same delay value for all of the restructured clock trees for the clock sources in the group. The delay values of the horizontal distribution tracks decrease by one with each crossing of a horizontal distribution track with the spines as shown in FIGS. 2 and 6, for example. The same delay values helps to provide delay matching for all CDC paths for the clock sources in each set. In the example of FIG. 16, the programmable delay values of horizontal distribution tracks 702, 704, and 706 are equal. At block 708 of FIG. 15, the EDA tool returns to the process of FIG. 3 and continues with routing of the circuit design.

The approach described in FIG. 15 may not remedy clock skew for some specific CDC tree structures. One example is a circuit block in which the max skew requirements on two clock inputs require a matching topology, but one clock signal must always lag the other clock signal for correct functional behavior in the circuit block. To address this issue, imbalanced clock trees may be created. Matching clock topologies are created for clock sources involved. However, the delay values on the horizontal distribution tracks are imbalanced such that the special requirement of the max skew is met.

Figure 17:
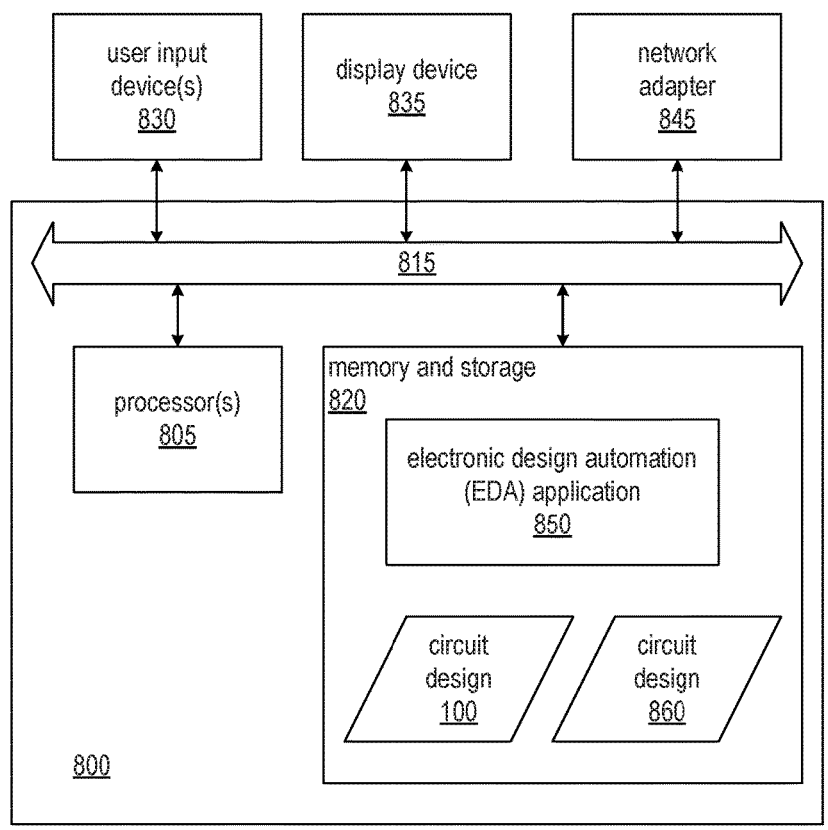
FIG. 17 is a block diagram illustrating an exemplary data processing system.

FIG. 17 is a block diagram illustrating an exemplary data processing system (system) 800. System 800 is an example of an EDA system. As pictured, system 800 includes at least one processor circuit (or "processor"), e.g., a central processing unit (CPU) 805 coupled to memory and storage arrangement 820 through a system bus 815 or other suitable circuitry. System 800 stores program code and circuit design 100 within memory and storage arrangement 820. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system 800. The I/O devices may be coupled to system 800 either directly or through intervening I/O controllers. A network adapter 845 also can be coupled to system 800 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Memory and storage arrangement 820 may store an EDA application 850. EDA application 850, being implemented in the form of executable program code, is executed by processor(s) 805. As such, EDA application 850 is considered part of system 800. System 800, while executing EDA application 850, receives and operates on circuit design 100. In one aspect, system 800 performs a design flow on circuit design 100, and the design flow may include synthesis, mapping, placement, routing, and the application of one or more physical optimization techniques as described herein. System 800 generates an optimized, or modified, version of circuit design 100 as circuit design 860.

EDA application 850, circuit design 100, circuit design 860, and any data items used, generated, and/or operated upon by EDA application 850 are functional data structures that impart functionality when employed as part of system 800 or when such elements, including derivations and/or modifications thereof, are loaded into an IC such as a programmable IC causing implementation and/or configuration of a circuit design within the programmable IC.

FIG. 18 shows a programmable integrated circuit (IC) 900 on which the disclosed clock distribution networks may be implemented. The programmable IC may also be referred to as a System On Chip (SOC) that includes field programmable gate array logic (FPGA) along with other programmable resources. FPGA logic may include several different types of programmable logic blocks in the array. For example, FIG. 18 illustrates programmable IC 900 that includes a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907, for example, clock ports, and other programmable logic 908 such as digital clock managers, analog-to-digital converters, system monitoring logic, and so forth. Some programmable IC having FPGA logic also include dedicated processor blocks (PROC) 910 and internal and external reconfiguration ports (not shown).

In some FPGA logic, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA logic. The programmable interconnect element INT 911 also includes the connections to and from the programmable logic element within the same tile, as shown by the examples included at the top of FIG. 18.

For example, a CLB 902 can include a configurable logic element CLE 912 that can be programmed to implement user logic, plus a single programmable interconnect element INT 911. A BRAM 903 can include a BRAM logic element (BRL) 913 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element (DSPL) 914 in addition to an appropriate number of programmable interconnect elements. An 10B 904 can include, for example, two instances of an input/output logic element (IOL) 915 in addition to one instance of the programmable interconnect element INT 911. As will be clear to those of skill in the art, the actual I/O bond pads connected, for example, to the I/O logic element 915, are manufactured using metal layered above the various illustrated logic blocks, and typically are not confined to the area of the input/output logic element 915.

In the pictured embodiment, a columnar area near the center of the die (shown shaded in FIG. 18) is used for configuration, clock, and other control logic. Horizontal areas 909 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 18 include additional logic blocks that disrupt the regular columnar structure making up a large part of the programmable IC. The additional logic blocks can be programmable blocks and/or dedicated logic. For example, the processor block PROC 910 shown in FIG. 18 spans several columns of CLBs and BRAMs.

Note that FIG. 18 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 18 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination. Terms such as "vertical" and "horizontal" may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The disclosed methods and system are thought to be applicable to a variety of systems for addressing clock skew. Other aspects and features will be apparent to those skilled in the art from consideration of the specification. It is intended that the specification and drawings be considered as examples only, with a true scope of the invention being indicated by the following claims.

What is claimed is:

1. A method of generating a clock tree for a circuit design, comprising:
    on a programmed processor, performing operations including:
        generating initial clock trees having elements assigned to locations on a programmable integrated circuit (IC), each of the initial clock trees including, respectively:
            a clock root centered among a plurality of clock loads,
            a spine including the clock root,
            a plurality of branches connected to and extending from the spine,
            each clock load of the plurality of clock loads coupled to one of the branches, and
            a plurality of programmable delay circuits coupled to the plurality of branches, respectively, and programmed by initial delay values, wherein for each one branch of the plurality of branches that is nearer the clock root than another branch of the plurality of branches, the initial delay value of the respective programmable delay circuit coupled to the one branch is greater than the initial delay value of the respective programmable delay circuit coupled to the other branch;
        determining whether or not the circuit design satisfies timing constraints;
        moving, in response to determining that the circuit design not satisfy the timing constraints, at least one respective clock root of a clock tree of the initial clock trees from a respective first location to a respective second location that satisfies the timing requirements;
        routing the circuit design after moving the at least one respective clock root;
        generating configuration data after routing the circuit design; and
        configuring the programmable IC with the generated configuration data to implement the circuit design on the programmable IC.

2. The method of claim 1, further comprising, in response to determining that the circuit design does not satisfy the timing constraints, modifying a clock tree of the initial clock trees to include multiple clock roots and multiple spines.

3. The method of claim 2, wherein the modifying includes:
    selecting a subset of the plurality of clock loads;
    establishing another spine and another plurality of branches connected to and extending from the other spine, wherein the other plurality of branches is coupled to another plurality of programmable delay circuits and to the subset of the plurality of clock loads;
    establishing another clock root centered among the subset of the plurality of clock loads; and
    generating respective delay values for the other plurality of programmable delay circuits.

4. The method of claim 1, further comprising:
    changing, in response to determining that the circuit design does not satisfy the timing constraints, at least one of the initial delay values.

5. The method of claim 4, wherein:
    the plurality of clock loads includes a plurality of path sources and a plurality of path destinations, each path source has an output coupled to one or more of the path destinations;
    the determining includes determining critical paths for the initial clock trees, each critical path including one of the plurality of path sources coupled to one of the plurality of path destinations; and
    the changing includes prioritizing changing the initial delay value of the programmable delay circuit of the branch coupled to the path source over changing the initial delay value of the programmable delay circuit of the branch coupled to the path destination.

6. The method of claim 1, wherein:
the plurality of clock loads includes a plurality of path sources and a plurality of path destinations, each path source has an output coupled to one or more of the path destinations;
the determining includes determining a respective set of critical paths for the initial clock trees, each critical path including one of the plurality of path sources coupled to one of the plurality of path destinations; and
the moving includes moving the at least one respective clock root nearer a plurality of path sources of the respective set of critical paths.

7. The method of claim 1, wherein:
the IC includes routing tracks and distribution tracks, and the spine and plurality of branches are parts of the distribution tracks;
the IC includes a plurality of clock regions, each clock region includes a respective subset of synchronous circuit elements, and the clock loads are implemented on the respective subsets of synchronous circuit elements;
the routing tracks are configurable to carry clock signals to selected ones of the clock regions, within each clock region the routing tracks are configurable to connect to a signal line of the distribution tracks in the clock region, and within each clock region the distribution tracks are configurable to carry clock signals to the synchronous circuit elements in the clock region;
the initial clock trees include at least two initial clock trees, and the at least two initial clock trees include respective clock sources connected to respective clock roots in respective, different ones of the clock regions of the IC; and
the moving includes moving the respective clock roots of the at least two initial clock trees from the respective, different ones of the clock regions to a single clock region.

8. The method of claim 7, wherein the moving the respective clock roots to a single clock region includes:
determining an area of the IC that includes clock regions having respective subsets of synchronous circuit elements coupled to branches of the at least two initial clock trees; and
determining a selected clock region within the area having resources available for a clock root and proximate a center of the area, wherein the selected clock region is the single clock region.

9. The method of claim 7, wherein the moving the respective clock roots to a single clock region includes establishing respective spines connected to the clock roots and respective sets of branches connected to the respective spines, and the method further comprising setting delay values on programmable delay circuits of each respective set of branches, wherein the delay values of each respective set of branches match the delay values of each other respective set of branches.

10. A system for generating a clock tree for a circuit design, comprising:
a computer processor;
a memory arrangement coupled to the computer processor, wherein the memory arrangement is configured with instructions that when executed by the computer processor cause the computer processor to perform operations including:
generating initial clock trees having elements assigned to locations on a programmable integrated circuit (IC), each of the initial clock trees including, respectively:
a clock root centered among a plurality of clock loads,
a spine including the clock root,
a plurality of branches connected to and extending from the spine,
each clock load of the plurality of clock loads coupled to one of the branches, and
a plurality of programmable delay circuits coupled to the plurality of branches, respectively, and programmed by initial delay values, wherein for each one branch of the plurality of branches that is nearer the clock root than another branch of the plurality of branches, the initial delay value of the respective programmable delay circuit coupled to the one branch is greater than the initial delay value of the respective programmable delay circuit coupled to the other branch;
determining whether or not the circuit design satisfies timing constraints;
moving, in response to determining that the circuit design not satisfy the timing constraints, at least one respective clock root of a clock tree of the initial clock trees from a respective first location to a respective second location that satisfies the timing requirements;
routing the circuit design after moving the at least one respective clock root;
generating configuration data after routing the circuit design; and
configuring the programmable IC with the generated configuration data to implement the circuit design on the programmable IC.

11. The system of claim 10, the operations further comprising, in response to determining that the circuit design does not satisfy the timing constraints, modifying a clock tree of the initial clock trees to include multiple clock roots and multiple spines.

12. The system of claim 11, wherein the instructions for modifying include instructions that when executed by the computer processor cause the computer processor to:
select a subset of the plurality of clock loads;
establish another spine and another plurality of branches connected to and extending from the other spine, wherein the other plurality of branches is coupled to another plurality of programmable delay circuits and to the subset of the plurality of clock loads;
establish another clock root centered among the subset of the plurality of clock loads; and
generate respective delay values for the other plurality of programmable delay circuits.

13. The system of claim 10, the operations further comprising:
changing, in response to determining that the circuit design does not satisfy the timing constraints, at least one of the initial delay values.

14. The system of claim 13, wherein:
the plurality of clock loads includes a plurality of path sources and a plurality of path destinations, each path source has an output coupled to one or more of the path destinations;
the instructions for determining include instructions that when executed by the processor cause the processor to determine critical paths for the initial clock trees, each critical path including one of the plurality of path sources coupled to one of the plurality of path destinations; and the instructions for changing include instructions that when executed by the processor cause the processor to prioritize changing the initial delay value of the programmable delay circuit of the branch coupled to the path source over changing the initial delay value of the programmable delay circuit of the branch coupled to the path destination.

15. The system of claim 10, wherein:

the plurality of clock loads includes a plurality of path sources and a plurality of path destinations, each path source has an output coupled to one or more of the path destinations;

the instructions for determining include instructions that when executed by the processor cause the processor to determine a respective set of critical paths for the initial clock trees, each critical path including one of the plurality of path sources coupled to one of the plurality of path destinations; and the instructions for moving include instructions that when executed by the processor cause the processor to move the at least one respective clock root nearer a plurality of path sources of the respective set of critical paths.

16. The system of claim 10, wherein:

the IC includes routing tracks and distribution tracks, and the spine and plurality of branches are parts of the distribution tracks;

the IC includes a plurality of clock regions, each clock region includes a respective subset of synchronous circuit elements, and the clock loads are implemented on the synchronous circuit elements;

the routing tracks are configurable to carry clock signals to selected ones of the clock regions, within each clock region the routing tracks are configurable to connect to a signal line of the distribution tracks in the clock region, and within each clock region the distribution tracks are configurable to carry clock signals to the synchronous circuit elements in the clock region;

the initial clock trees include at least two initial clock trees, and the at least two initial clock trees include respective clock sources connected to respective clock roots in respective, different ones of the clock regions of the IC; and the instructions for moving include instructions that when executed by the processor cause the processor to move the respective clock roots of the at least two initial clock trees from the respective, different ones of the clock regions to a single clock region.

17. The system of claim 16, wherein instructions for the moving the respective clock roots to a single clock region include instructions that when executed by the processor cause the processor to:

determine an area of the IC that includes clock regions having respective subsets synchronous circuit elements coupled to branches of the at least two initial clock trees; and determine a selected clock region within the area having resources available for a clock root and proximate a center of the area, wherein the selected clock region is the single clock region.

18. The system of claim 16, wherein:

the instructions for moving the respective clock roots to a single clock region include instructions that when executed by the processor cause the processor to establish respective spines connected to the clock roots and respective sets of branches connected to the respective spines; and the operations further comprising setting delay values on programmable delay circuits of each respective set of branches, wherein the delay values of each respective set of branches match the delay values of each other respective set of branches.

* * * * *